Figure 1:
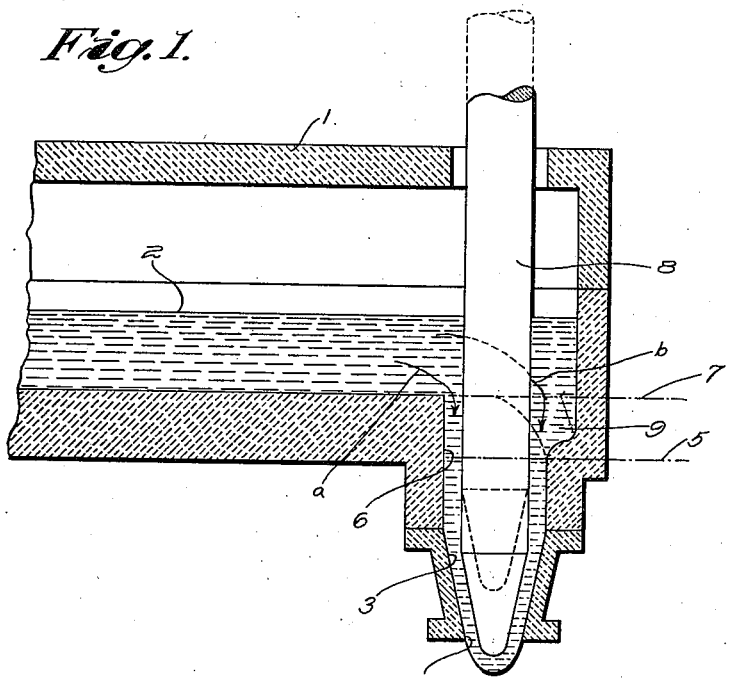

March 3, 1936.   G. E. HOWARD   2,033,075
APPARATUS FOR FEEDING MOLTEN GLASS
Filed Oct. 24, 1932

Witness:
W. B. Thayer

Inventor:
George E. Howard
by Brown & Parham
Attorneys

Patented Mar. 3, 1936

2,033,075

UNITED STATES PATENT OFFICE 2,033,075

APPARATUS FOR FEEDING MOLTEN GLASS

George E. Howard, Butler, Pa., assignor to Hartford-Empire Company, Hartford, Conn., a corporation of Delaware Application October 24, 1932, Serial No. 639,217

4 Claims. (Cl. 49—55)

This invention relates generally to improvements in apparatus for feeding molten glass from a supply body through an outlet that is submerged by glass of the supply body.

More particularly described, the invention has reference to the feeding of molten glass in preformed "suspended charges" by glass feeders of that type of construction which comprises a glass feeding forehearth or container from which glass is discharged through a submerged well or vertical outlet passage adjacent to the outer end of the forehearth or container, such well or outlet passage terminating at its lower end in an outlet orifice, and the discharge of glass from the orifice being under the control of a reciprocating vertical implement that depends into the glass in the submerged well or outlet passage.

In feeders of the type above referred to, it is usual to provide glass flow communication between the feeding forehearth or container and a furnace or source of supply of molten glass so as to maintain a predetermined head of glass in the container and over the submerged well or outlet passage. Glass entering the well or outlet passage at the front thereof thus may be required to travel farther than the glass entering the well or outlet passage at the rear thereof. Furthermore, radiation of heat from the glass at the front of the forehearth or container ordinarily is greater than from the more rearwardly disposed glass in the feeding container. For these and possibly other reasons, the glass above the front portion of the well or outlet passage tends to become colder and more sluggish than the glass above or passing to the remainder of such well or outlet passage.

In consequence, glass in the front portion of the well or outlet passage may be colder and flow or move downwardly therein more slowly than glass in the remainder of such well or outlet passage. When this condition exists, the column or suspended mold charge mass produced by the issuance of glass from the outlet may be laterally warped or otherwise unsymmetrical in shape and so non-uniform in temperature and viscosity in different portions thereof as to preclude the severance therefrom of a mold charge that would be satisfactory for fabrication into a high grade or even acceptable article of glassware.

An object of the present invention is to provide simple and effective means for controlling flow of glass to the discharge orifice at the lower end of the submerged well or outlet passage of a feeder of the type referred to, so as to compensate for or eliminate differentials which exist between the temperatures and viscosities of the portions of glass above or passing into different portions of the well or outlet passage and so that the suspended mold charge masses of glass discharged from such orifice will be more symmetrical in shape and of axially symmetrical viscosity and temperature.

One mode of carrying out the present invention will now be generally described.

Assuming that the annular flow passageway between the walls of the well or outlet passage of a glass feeder and the vertical implement or plunger that depends into the glass therein is of substantially uniform or constant width at all points around the plunger and in the same plane, then the resistance offered by the front and rearward portions of such passageway to flow or movement of glass downwardly therein to the lower end of the implement will be approximately the same. However, because of the more direct path for glass from the source of supply to the rearward side of the upper end of such a passageway and because of the greater fluidity of the hotter glass at such place, glass flow down the rearward side of the passageway would be more rapid than at the front side thereof. Consequently, the glass flowing down the rearward side of the passageway past the lower end of the implement would be greater in volume in a given time and hotter than the glass flowing down the front side of such passageway. This would lead to the production of objectionable or undesirable unsymmetrical suspended mold charge masses, as hereinbefore has been pointed out. In order to obviate such undesirable result, the present invention contemplates lateral enlargement of the passageway at the front, i. e., at the side thereof to which colder and more sluggish glass will pass at the end of the longer path from the furnace or source of supply.

The cross-sectional area of the laterally enlarged portion of the passageway and the vertical extent thereof will be predetermined with reference to the width of the opposite portion of such passageway and in consideration of the differentials that exist between the temperatures and viscosities of the portions or streams of glass passing to such portions of the passageway so that the consequent difference between the resistance to flow of glass downwardly through such portions of the passageway will compensate for or practically eliminate such temperature and viscosity differentials. In other words, the resistance to the downward flow of the hotter and more fluid glass in the rearward portion of the passageway will be sufficiently greater than the resistance to downward flow of the colder and more sluggish glass in the front portion of the passageway to cause approximate equalization of the rate of flow and the temperature and viscosity of the downwardly moving glass in the passageway at or before such glass passes below the lower end of the vertical implement and into the portion of the well or outlet passage in which impulses are applied to the glass by the reciprocatory movements of such implement. Because of the different resistances to downward flow of glass in the front and rearward portions of the passageway to the level at which the substantial equalizations of temperatures, viscosities and rates of flow are to be effected, the initially hotter and more fluid glass will travel more slowly than the initially colder and more sluggish glass, and thus will lose heat by radiation for a longer time than the initially cooler glass before that level is reached.

The well or outlet passage preferably will be symmetrical in cross sectional configuration from the discharge orifice at the lower end thereof to the level of the lower end of the laterally enlarged or unsymmetrical higher portion of such well or outlet passage, which level should be above or not substantially lower than the highest level to which the reciprocating vertical implement or plunger will be raised at any time during glass feeding operations by apparatus to which the present invention has been applied. The glass charge shaping impulses resulting from the reciprocatory strokes of the plunger thus will be effective on the glass to which such impulses are applied to produce symmetrically shaped mold charge masses in suspension from the discharge outlet of the feeder.

Figure 2:
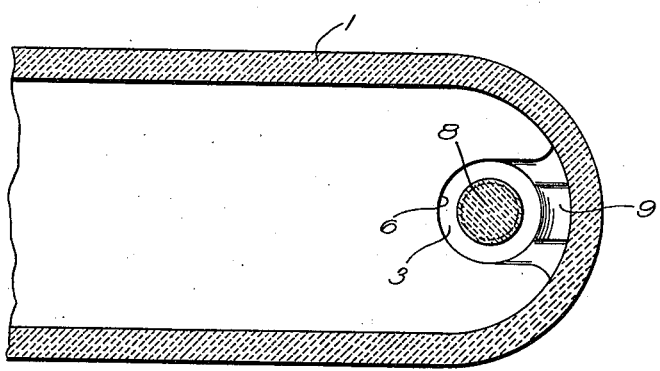

Other objects and advantages of the invention will be pointed out in, or become apparent from, the following description of a practical embodiment of the invention, when such description is considered in conjunction with the accompanying drawing, in which Figure 1 is a fragmentary vertical section through a glass feeding forehearth to which the invention has been applied, the view showing in elevation a fragmentary portion of a reciprocable vertical plunger for controlling discharge of glass from the discharge outlet of the forehearth; and Fig. 2 is a horizontal section through the structure shown in Fig. 1.

In the drawing, the numeral 1 indicates a portion of a glass feeding forehearth or container. The showing of such forehearth or container, apart from the features of improvement resulting from the present invention and to which attention hereinafter will be particularly directed, is intended to be more or less diagrammatic and as indicating any forehearth or feeding container of any suitable known construction and provided with any known beneficial structural features and appurtenances that those skilled in the art might desire to use.

Molten glass from a suitable source of supply, such as a melting furnace or tank (not shown), may flow into or otherwise be supplied to the forehearth or container 1 so as to fill the latter to a desirable level, such as that indicated at 2 in Fig. 1. The body of molten glass in the container 1 thus submerges a well or vertical outlet passage that is located at the bottom of the outer end portion of the forehearth or container.

Such well or outlet passage comprises a symmetrical portion 3 extending from the outlet orifice 4 to the level indicated at 5 in Fig. 1 and an unsymmetrical portion 6 extending from the level 5 to the level of the bottom of the container 1, such level being indicated at 7 in the same view.

A refractory implement or plunger 8 depends through a suitable opening in the top of the container 1 into the glass in the well or outlet passage, and preferably is disposed in substantially axial alignment with the outlet orifice 4 and in concentric relation with the symmetrical portion 3 of such well or outlet passage. Any suitable mechanism (not shown) may be provided for adjustably supporting the implement 8 and for reciprocating it vertically so that its downstroke will accelerate discharge of glass from the orifice 4 and its upstroke will stop, retard or reverse flow of glass at the orifice. Many examples of adjustable supporting and operating mechanisms for the vertical implement or plunger of a feeder of the type hereinbefore referred to are known in the art, and therefore need not be illustrated nor specifically described in this application.

The lower end portion of the implement 8 preferably remains constantly in the well or outlet passage and, during operation, is at all times spaced from the walls thereof sufficiently to provide a constantly open passageway for flow of glass from the supply body in the container 1 to the outlet orifice 4 and so that an air-excluding layer of molten glass constantly encompasses the lower end portion of the implement.

In Fig. 1, full lines indicate the implement 8 when it is at the lower end of its downstroke or just after it has started to move upward and after a charge has been severed in suspension below the outlet orifice. The dot-and-dash lines indicate the position of the implement when it has been moved upward until its lower end has reached a predetermined upper limit. It, of course, is to be understood that the lower and upper limits of the strokes of the lower end of the implement may be varied when desired by means and for reasons which are well known in the art.

It also is to be understood that the charges to be obtained by the use of the glass feeding apparatus that has been described so far may be severed from successive suspended mold charge masses at a suitable plane below the orifice 4 by suitable severing mechanism (not shown).

The unsymmetrical portion 6 of the well or outlet passage has been enlarged laterally at the front, as at 9. The enlargement of this portion of the well or outlet passage may be effected by cutting away from the inside a portion of the wall thereof. The extent of such enlargement, both vertically and horizontally, has been predetermined and selected in view of differentials of viscosity and temperature between glass passing along the more direct path, indicated by the arrow $a$, and glass passing along the longer path, indicated by the arrow $b$, to the rearward and front portions, respectively, of the well or outlet passage so as to reduce the resistance to downward flow in the area 9 from the level 7 to the level 5 sufficiently below the resistance to downward flow between the same levels of the hotter and more fluid glass at the rearward side of the well or outlet passage to compensate for or eliminate such differentials at approximately the level 5. Because of the symmetrical configuration of the portion 3 of the well or outlet passage below the level 5, and the centered position of the depending lower end portion of the implement 8 therein, the further downward flow of glass at the front and rear sides of the well or outlet passage will encounter a substantially uniform frictional resistance. If, then, the temperatures and viscosities of the initially differentially moving portions or streams of glass have been substantially equalized by the time such glass reaches the level 5 or shortly thereafter, the further downward movement of such glass will be substantially uniform.

It is desirable that equalization of downward or flow movement of the glass in the well or outlet passage and of the temperature and condition of such glass should be effected by the time such glass reaches the level in the well or outlet passage at which the reciprocating implement will be effective to apply glass discharge accelerating and retarding impulses thereto. Discharge of glass from the outlet orifice thus may be controlled and regulated as required to produce suspended mold charge masses of symmetrical shape and of axially symmetrical viscosity and temperature conditions. Mold charges severed therefrom thus will be suitable for fabrication into high grade articles of glassware.

The principle of the invention also may be applied usefully to glass feeding forehearths or containers which are equipped with other known means for controlling the temperature and condition of the glass passing to the outlets of such forehearths or containers. The details of construction embodying the invention may vary according to different conditions incident to or with which the application and use thereof are concerned, but the principle remains the same.

I claim:

1. Glass feeding apparatus comprising a forehearth having a submerged well or outlet passage adjacent to its outer end, said well or outlet passage terminating at its lower end in an orifice, and an implement adapted to be reciprocated vertically with its lower end constantly in said well or outlet passage in substantially axial alignment with said orifice, the space between said implement and the wall of said well or outlet passage being open for the full width of this space at all points around said implement, the upper end portion of said well or outlet passage being enlarged toward the outer end of the forehearth at a level not below that of the upper limit of the path of working movement of the lower end of said vertical implement so as to offer less resistance to downward flow of glass in the outer part of the upper end portion of said well or outlet passage than in the remainder thereof.

2. Glass feeding apparatus comprising a container for molten glass having a submerged well or vertical outlet passage adjacent to its outer end, said well or outlet passage terminating at its lower end in a discharge orifice and being symmetrical from its lower end for part of its length, the remaining portion of said well or outlet passage being unsymmetrical and, as compared with said symmetrical portion of the well or outlet passage, being enlarged toward the outer end of said container so as to offer less resistance to the downward flow of glass in the outer part of said unsymmetrical portion of said well or outlet passage than in the remainder thereof, and a vertical implement depending into the glass in said well in concentric relation with the walls of the symmetrical portion of said well or outlet passage for controlling discharge of glass through said orifice, the lower end of said vertical implement being constantly in the well during operation with the tip of the implement below the level of the lower end of the enlarged portion of the well.

3. Glass feeding apparatus comprising a forehearth having a submerged well or outlet passage adjacent to its outer end, said well or outlet passage terminating at its lower end in an orifice and having its upper end located at a level approximating that of the floor of the forehearth, and an implement adapted to be reciprocated vertically with its lower end constantly in said well or outlet passage in substantially axial alignment with said orifice, the upper end portion of said well or outlet passage being enlarged above the level of the lower end of said implement toward the outer end of the forehearth so that the space between said implement and the wall of said enlarged portion of the well or outlet passage is of greater radial extent than the space between any other portion of the implement and the adjacent wall of the well or outlet passage and thus will offer less resistance to downward flow of glass in the outer part of the upper end portion of said well or outlet passage than in the remainder thereof.

4. Glass feeding apparatus comprising a forehearth having an outlet structure adjacent to its outer end, said outlet structure being formed to provide a substantially vertical well terminating at its upper end at the approximate level of the upper surface of the floor of the forehearth and having its lower end formed to provide a discharge orifice that is located a substantial distance below the level of the lower surface of the floor of the forehearth, said well being circular in cross-sectional configuration at all levels from its lower end to a level approximating that of the lower surface of the floor of the forehearth and having the portion thereof above said last named level enlarged at its outer side only so that the radial distance from the vertical center line of the well to the wall of the outwardly enlarged portion thereof is greater than the radial distance between said vertical center line and the wall of any other portion of the well, and a vertically reciprocable implement depending in said well in concentric relation with the circular portion thereof and with the lower end of said implement constantly below the level of the outwardly enlarged upper portion of the well.

GEORGE E. HOWARD.